June 29, 1965  L. G. HILTNER  3,191,950
REINFORCED GASKET
Filed June 11, 1962
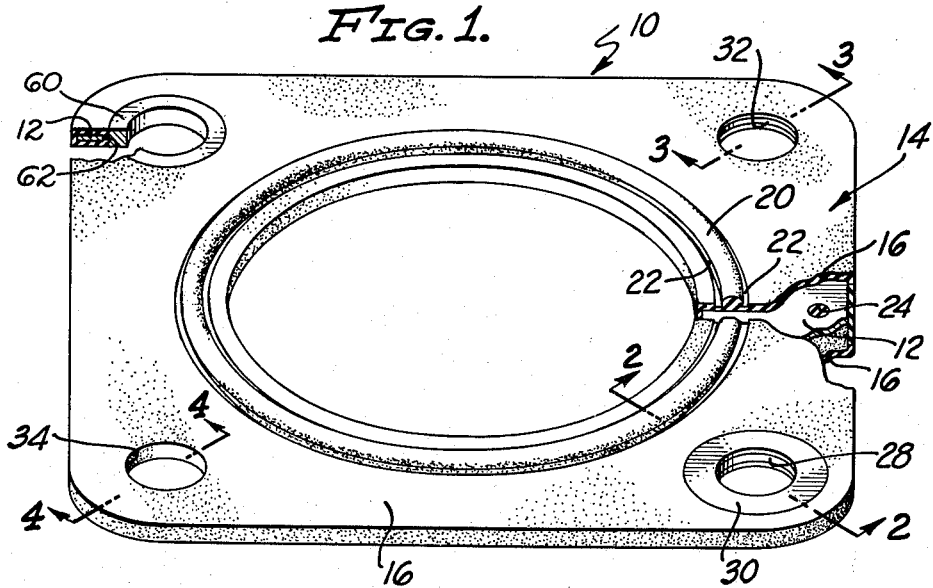
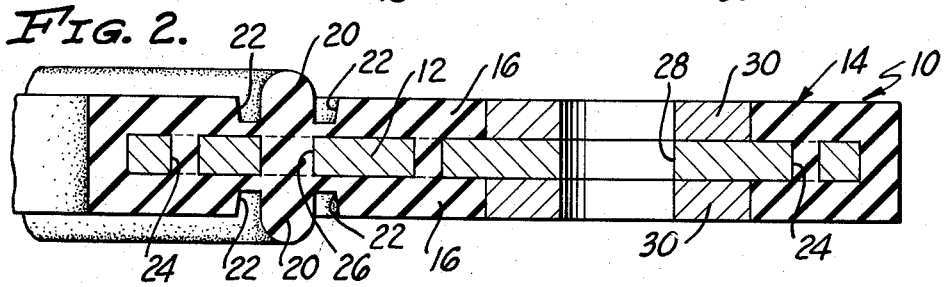
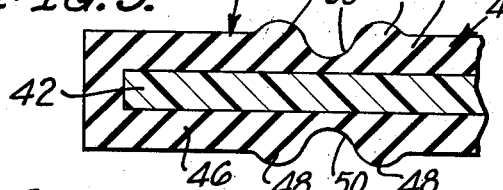
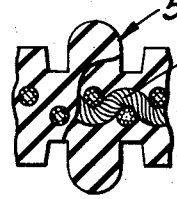
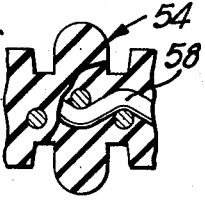
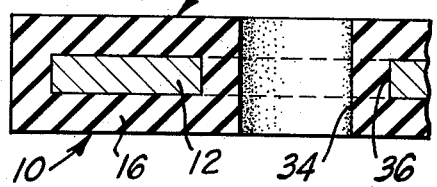
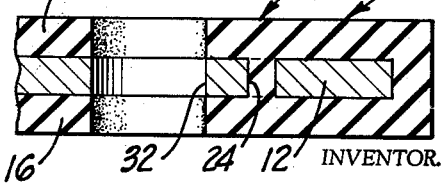
INVENTOR.
LUTHER G. HILTNER
BY HIS ATTORNEYS
HARRIS, KIECH, RUSSELL & KERN

United States Patent Office 3,191,950
Patented June 29, 1965

3,191,950
REINFORCED GASKET
Luther G. Hiltner, Los Angeles, Calif., assignor, by mesne assignments, to The Electrada Corporation, Los Angeles, Calif., a corporation of Delaware
Filed June 11, 1962, Ser. No. 201,417
3 Claims. (Cl. 277—180)

The present invention relates in general to gaskets for use between opposed mating surfaces of such items as housing components, sections of conduits, parts of hydraulic or pneumatic devices and the like.

Considering the background of the invention, it is conventional to provide a gasket comprising a rigid retainer having opposed surfaces which are provided with opposed grooves containing elastomeric seals respectively engageable with mating surfaces between which the gasket is disposed. It is also conventional in such a gasket to provide the seals with raised sealing ribs which project beyond the surfaces of the retainer, and to provide the seals with channels which are located alongside the sealing ribs and into which the sealing ribs are resiliently deformable when the gasket is clamped between two mating surfaces to be sealed, the channel volume associated with each sealing rib being substantially equal to the projecting volume of such sealing rib. Such a gasket is shown in Patent No. 2,717,793, granted September 13, 1955 to Joseph F. Nenzell.

Gaskets of the foregoing conventional type produce excellent seals and are capable of withstanding very high fluid pressures. However, such gaskets are expensive, both because of the machining operations required to form the seal grooves in the retainer, and because of the necessity for maintaining rather close tolerances in forming the surfaces of the retainer and in forming the opposed mating surfaces between which the gasket is installed. For many applications, gaskets of the nature under consideration are more expensive than warranted.

The primary object of the present invention is to provide a gasket which achieves similar results, but which is much more economical to manufacture and which does not require as close tolerances in the finishing and alignment of the opposed mating surfaces between which the gasket is used. The invention is of primary interest for low pressure applications, although it may be used with high pressures in many instances.

More particularly, an important object of the invention is to provide a gasket which is reinforced adequately for its intended conditions of use, which provides a satisfactory seal between opposed mating surfaces even with irregularities in and misalignment of such surfaces, and the like.

The invention accomplishes the foregoing by providing, and a basic object thereof is to provide, a gasket which includes: a simple reinforcing element having opposed surfaces which do not need to be grooved; a jacket of elastomeric material at least substantially encasing the reinforcing element and providing two elastomeric layers respectively disposed on opposite sides of the reinforcing element; a raised sealing rib integral with at least one of the elastomeric layers and projecting beyond the surface thereof; and at least one channel in such elastomeric layer alongside of and paralleling the sealing rib, the sealing rib being resiliently deformable into such channel upon clamping of the gasket between two opposed mating surfaces to be sealed.

The foregoing construction has various advantages. First, although the reinforcing element is at least substantially completely encased by the elastomeric jacket, it provides adequate reinforcement against lateral extrusion of the elastomeric material upon clamping of the gasket between opposed mating surfaces, upon moderate differential pressure applications across the gasket, and the like. Also, the reinforcing element whether rigid, or flexible as discussed hereinafter, provides the gasket with sufficient rigidity for easy handling and assembly, as opposed to a gasket formed entirely of an elastomeric material. Further, since the thickness of the elastomeric jacket is less than the total thickness of the gasket due to the presence of the reinforcing element, the amount of permanent set upon installation of the gasket is minimized, as compared to a gasket formed entirely of an elastomeric material.

Another object of the invention is to provide a gasket of the foregoing nature having a reinforcing element which is either rigid or flexible, the flexible reinforcing element comprising wire mesh, woven fabric, or the like.

A further object is to provide a gasket having a deformable reinforcing element so that the gasket may be formed flat and may be installed between opposed mating surfaces which are curved, this being an important feature.

Another object of the invention is to provide a gasket wherein the elastomeric layers on opposite sides of the reinforcing element are chemically bonded to the reinforcing element, or are mechanically cross linked by elastomeric material integral with the elastomeric layers and extending through openings in the reinforcing element. Such openings for mechanically cross linking the elastomeric layers may be holes formed in the reinforcing element, or, in the case of wire mesh or woven fabric reinforcing elements, they may simply be openings inherent in such reinforcing materials.

Another object of the invention is to provide a gasket having opposed sealing ribs on opposite sides thereof which are directly mechanically cross linked through intervening openings in the reinforcing element.

Another object is to provide a gasket having mounting holes which either expose the material of the reinforcing element, or which are lined with the elastomeric material of the encasing jacket.

A further object is to provide a gasket wherein each mounting hole is encircled by annular spacers secured to opposite sides, respectively, of the reinforcing element, or by a single annular spacer extending through the reinforcing element, the spacers or spacer being encircled by the respective elastomeric layers. Such a spacer or spacers may be used where it is desired to positively limit the minimum spacing of the opposed mating surfaces between which the gasket is inserted, thereby also minimizing the permanent set to which the elastomeric jacket is subjected.

An important advantage of complete encasement of the reinforcing element is that it is protected against corrosion by the elastomeric jacket in the event that it is formed of a material corrodible by the environment of use.

The foregoing objects, advantages, features and results of the present invention, together with various other objects, advantages, features and results thereof which will be evident to those skilled in the gasket art in the light of this disclosure, may be attained with the exemplary embodiments of the invention described in detail hereinafter and illustrated in the accompanying drawing, in which:

FIG. 1 is an isometric view of an illustrative gasket which embodies the invention;

FIGS. 2, 3 and 4 are enlarged, fragmentary sectional views respectively taken along the arrowed lines 2—2, 3—3 and 4—4 of FIG. 1, and respectively illustrating different embodiments of the invention; and FIGS. 5, 6 and 7 are fragmentary sectional views respectively illustrating other embodiments of the invention.

In FIG. 1 of the drawing is illustrated a flat gasket 10 which incorporates various embodiments of the invention and which is intended as illustrative only. As will be apparent, the invention is not limited to the particular embodiments incorporated in the gasket 10, nor is the invention to be limited to the particular gasket configuration shown. Obviously, the gasket configuration will be dictated by the environment of use, and numerous configurations are possible within the scope of the invention.

In the embodiment of the invention illustrated in FIG. 2 of the drawing and in the corresponding portion of FIG. 1 thereof, there is a reinforcing element 12 embedded in, and preferably substantially centered in, an elastomeric jacket 14 which provides elastomeric layers 16 respectively disposed on opposite sides of the reinforcing element. It will be noted that the elastomeric jacket 14 substantially completely encases the reinforcing element 12, being molded around the edges thereof. The reinforcing element 12 is a relatively thin, flat sheet which may be formed of metal, plastic, or any other suitable material.

Integral with the elastomeric layers 16 are raised sealing ribs 20 which project beyond the exposed surfaces of the elastomeric layers for engagement with opposed mating surfaces, not shown, to be sealed. Alongside and paralleling each sealing rib 20 are channels 22 formed in the corresponding elastomeric layer. When the sealing ribs 20 are clamped between two opposed mating surfaces to be sealed, they are elastically deformed into the channels 22, this construction providing reduced clamping forces. It will be understood that the projecting volume of each sealing rib 20 is substantially equal to the volume of the adjacent channels 22 so that the projecting volume of each sealing rib can be resiliently deformed into the adjacent channels.

To provide structural integrity for the elastomeric jacket 14, the elastomeric layers 16 are integrally cross linked through the reinforcing element 12 by molding the elastomeric material into openings 24 and 26 through the reinforcing element 12. The openings 26, only one of which is visible in FIG. 2 of the drawing, are aligned with the sealing ribs 20 and directly cross link the sealing ribs through the reinforcing element 12.

The gasket 10 is provided with a mounting hole 28, FIGS. 1 and 2, which is encircled by annular spacers 30 respectively secured to opposite sides of the reinforcing element 12, as by a suitable bonding process, e.g., welding, dependent on the nature of the material of the reinforcing element 12. The spacers 30 are encircled by and molded into the material of the elastomeric layers 16, and are substantially flush with the exposed surfaces of such layers. With this construction, opposed mating surfaces between which the gasket 10 is inserted are spaced apart a fixed minimum distance by the spacers 30 and the intervening portion of the reinforcing element 12. Also, the spacers 30 minimize the amount of permanent set to which the elastomeric jacket 14 is subjected upon clamping of the gasket between opposed mating surfaces.

In FIG. 3 of the drawing, and in the corresponding portion of FIG. 1 thereof, there is shown a mounting hole 32 which simply extends directly through the reinforcing element 12 and the elastomeric layers 16. With this construction, the periphery of that portion of the hole 32 which extends through the reinforcing element 12 is exposed.

In FIG. 4 of the drawing, and in the corresponding portion of FIG. 1 thereof, there is shown a mounting hole 34 the periphery of which is formed entirely of the elastomeric material of the jacket 14. In this instance, the reinforcing element 12 is provided with a corresponding opening 36 which is considerably larger than the mounting hole 34 to permit forming the periphery of the mounting hole of the elastomeric material. The structure of FIG. 4 is particularly useful where complete isolation of the reinforcing element 12 is desired and where accurate mounting is not essential, it being apparent that the deformability of the elastomeric jacket 14 will permit slight lateral shifting of the gasket. However, such slight freedom of lateral movement of the gasket is normally not objectionable.

In FIG. 5 of the drawing is shown a fragment of a gasket 40 which is similar to the gasket 10 and similarly includes a reinforcing element 42 and an elastomeric jacket 44 providing elastomeric layers 46 on opposite sides of the reinforcing element. Each elastomeric layer 46 includes two spaced, parallel sealing ribs 48 projecting from the corresponding gasket surface and separated by a channel 50 having a volume substantially equal to the sum of the projecting volumes of the two ribs. This sealing rib structure has all of the advantages of that previously described, and has the additional advantage of providing two zones of sealing contact.

In FIGS. 6 and 7 of the drawing are shown fragments of gaskets 52 and 54 which are similar to the gasket 10, but which differ in utilizing woven fabric 56 and woven wire mesh 58, respectively, as the reinforcing elements thereof. With either the fabric 56 or the wire mesh 58, the elastomeric layers on opposite sides thereof are mechanically cross linked through the openings inherently provided in the reinforcements. It will be understood that the surface treatment of the gaskets 52 and 54 may be the same as that of the gasket 10, as shown, or may be the same as that of the gasket 40.

In the upper left hand corner of FIG. 1 of the drawing is shown still another embodiment of the invention wherein a single tubular spacer 60 extends entirely through the gasket 10 and is molded into the elastomeric material of the gasket along with the reinforcing element 12. The latter is provided with a hole 62 there through for the tubular spacer 60, which hole may snugly receive the spacer, or which may loosely receive it as shown. In the latter event, the elastomeric material may separate the tubular spacer 60 from the reinforcing element 12, as shown. This construction has all the advantages of that of FIG. 2 and the corresponding portion of FIG. 1, but has additional advantages. For one thing, no bonding of the tubular spacer 60 to the reinforcing element 12 is necessary. Secondly, the tubular spacer 60, being only one piece, is simpler and less expensive, both from the standpoint of manufacture and from the standpoint of assembly with reinforcing element 12 for molding purposes. Further, the spacer 60 and the reinforcing element 12 may be placed in a mold independently without regard to whether the reinforcing element is perferctly centered.

Although exemplary embodiments of the invention have been disclosed herein for purposes of illustration, it will be understood that various changes, modifications and substitutions may be incorporated in such embodiments without departing from the spirit of the invention as defined by the claims which follow.

I claim:
1. A reinforced gasket, including:
 (a) a reinforcing element;
 (b) a jacket of elastomeric material at least substantially encasing said reinforcing element and providing two elastomeric layers respectively disposed on opposite sides of said reinforcing element;
 (c) two opposed, raised sealing ribs integrally formed in said elastomeric layers, respectively, and projecting outwardly beyond the outer surfaces thereof;
 (d) each of said elastomeric layers having at least one channel therein inwardly of the outer surface thereof and located alongside of and paralleling the corresponding one of said sealing ribs;
 (e) said sealing ribs being resiliently deformable into said channels;
 (f) said gasket being provided with a mounting hole therethrough; and
 (g) at least one annular spacer encircling said mounting hole and encircled by said elastomeric layers.
2. A reinforced gasket, including:
 (a) a reinforcing element;

(b) a jacket of elastomeric material at least substantially encasing said reinforcing element and providing two elastomeric layers respectively disposed on opposite sides of said reinforcing element;
(c) two opposed, raised sealing ribs integrally formed in said elastomeric layers, respectively, and projecting outwardly beyond the outer surfaces thereof;
(d) each of said elastomeric layers having at least one channel therein inwardly of the outer surface thereof and located alongside of and paralleling the corresponding one of said sealing ribs;
(e) said sealing ribs being resiliently deformable into said channels;
(f) said gasket being provided with a mounting hole therethrough; and
(g) a single annular spacer encircling said mounting hole and extending through said reinforcing element and encircled by said elastomeric layers.

3. A reinforced gasket, including:
(a) a reinforcing element;
(b) a jacket of elastomeric material at least substantially encasing said reinforcing element and providing two elastomeric layers respectively disposed on opposite sides of said reinforcing element;
(c) two opposed, raised sealing ribs integrally formed in said elastomeric layers, respectively, and projecting outwardly beyond the outer surfaces thereof;
(d) each of said elastomeric layers having at least one channel therein inwardly of the outer surface thereof and located alongside of and paralleling the corresponding one of said sealing ribs;
(e) said sealing ribs being resiliently deformable into said channels;
(f) said gasket being provided with a mounting hole therethrough; and
(g) annular spacers encircling said mounting hole and secured to opposite sides, respectively, of said reinforcing element and encircled by said elastomeric layers, respectively.

References Cited by the Examiner

UNITED STATES PATENTS

| | | | |
|---|---|---|---|
| 214,083 | 4/79 | Beardmore | 277—235 |
| 622,899 | 4/99 | McDondland | 277—211 |
| 791,552 | 6/05 | Hance | 277—233 X |
| 965,022 | 7/10 | Schulteis | 277—211 |
| 1,273,738 | 7/18 | Christensen | 277—207 |
| 1,626,110 | 4/27 | Bailey et al. | 277—166 |
| 1,840,147 | 1/32 | Woolson | 277—166 |
| 1,969,795 | 4/34 | Hewitt | 277—207 |
| 2,058,010 | 10/36 | Fitch | 277—211 |
| 2,395,243 | 2/46 | Aukers | 277—166 |
| 2,599,767 | 6/52 | Long | 277—235 |
| 2,681,241 | 6/54 | Aukers | 277—211 |
| 2,720,406 | 10/55 | Balfe | 277—166 |
| 2,729,483 | 1/56 | Victor | 277—166 |
| 2,868,575 | 1/59 | Hawxhurst | 277—229 X |
| 2,992,151 | 7/61 | Niessen | 277—235 X |
| 3,061,321 | 10/62 | Smith | 277—180 |

FOREIGN PATENTS

| | | |
|---|---|---|
| 6,153 | 12/01 | Austria. |
| 566,237 | 11/58 | Canada. |
| 836,584 | 6/60 | Great Britain. |

LEWIS J. LENNY, *Primary Examiner.*

EDWARD V. BENHAM, *Examiner.*